(12) United States Patent
Rogunova et al.

(10) Patent No.: US 9,193,860 B2
(45) Date of Patent: *Nov. 24, 2015

(54) THERMOPLASTIC MOLDING COMPOSITION BASED ON AES RUBBER WITH LOW SURFACE GLOSS

(75) Inventors: Marina Rogunova, Pittsburgh, PA (US); James P. Mason, Carnegie, PA (US); James Y. J. Chung, Wexford, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 324 days.

This patent is subject to a terminal disclaimer.

(21) Appl. No.: 11/713,484

(22) Filed: Mar. 2, 2007

(65) Prior Publication Data

US 2008/0214720 A1    Sep. 4, 2008

(51) Int. Cl.
| | |
|---|---|
| C08L 51/04 | (2006.01) |
| C08L 51/06 | (2006.01) |
| C08L 55/02 | (2006.01) |
| C08L 69/00 | (2006.01) |
| C08L 25/08 | (2006.01) |

(52) U.S. Cl.
CPC ............. C08L 55/02 (2013.01); C08L 51/04 (2013.01); C08L 69/00 (2013.01); C08L 69/005 (2013.01); C08L 25/08 (2013.01)

(58) Field of Classification Search
USPC ............................... 525/65, 67, 68
See application file for complete search history.

(56) References Cited

U.S. PATENT DOCUMENTS

| | | | |
|---|---|---|---|
| 4,444,950 A * | 4/1984 | Sakano et al. .................. 525/67 |
| 4,460,733 A | 7/1984 | Carter, Jr. et al. ............. 524/493 |
| 4,526,926 A | 7/1985 | Weber et al. .................... 525/67 |
| 4,677,162 A | 6/1987 | Grigo et al. ...................... 525/67 |
| 4,742,104 A * | 5/1988 | Lindner et al. ................. 524/409 |
| 4,885,335 A | 12/1989 | Gallucci et al. ................. 525/67 |
| 4,885,336 A | 12/1989 | Boutni et al. | |
| 4,902,743 A | 2/1990 | Boutni ............................. 525/67 |
| 5,026,777 A | 6/1991 | Jalbert et al. .................... 525/65 |
| 5,229,456 A * | 7/1993 | Ilenda et al. ..................... 525/66 |
| 5,369,154 A * | 11/1994 | Laughner ...................... 523/436 |
| 5,369,172 A | 11/1994 | Morgan et al. | |
| 5,623,018 A | 4/1997 | Ohmae et al. | |
| 5,981,661 A | 11/1999 | Liao et al. | |
| 5,994,442 A * | 11/1999 | Fujiguchi et al. ............. 524/417 |
| 2007/0010618 A1 | 1/2007 | Chen et al. | |
| 2007/0010635 A1 | 1/2007 | Chen et al. | |
| 2007/0135570 A1 | 6/2007 | Krishnamurthy et al. | |
| 2008/0108751 A1* | 5/2008 | Rogunova et al. .............. 525/64 |
| 2009/0043038 A1* | 2/2009 | Rogunova et al. ............ 524/504 |

FOREIGN PATENT DOCUMENTS

| | | |
|---|---|---|
| CA | 2 033 903 C | 12/2001 |
| JP | 03199255 A | 8/1991 |
| JP | 06192554 A | 7/1994 |

* cited by examiner

Primary Examiner — Jeffrey Mullis
(74) Attorney, Agent, or Firm — Richard P. Bender; John E. Mrozinski, Jr.; Aron Preis

(57) ABSTRACT

A thermoplastic composition suitable for making articles having low gloss and good impact properties is disclosed. The composition contains
(A) 20 to 94.5 percent relative to the weight of the composition (pbw) of an aromatic (co)poly(ester)carbonate,
(B) 5 to 40 pbw of a graft (co)polymer that includes an EPDM graft base and a grafted phase that is compatible with the aromatic (co)poly(ester)carbonate, and
(C) 0.5 to 20 pbw of a linear copolymer containing at least one unit derived from a glycidyl ester monomer, and
(D) 0 to 40 pbw of a vinyl copolymer.
The gloss of the composition is lower than that of a corresponding composition that contains none of component (C).

20 Claims, No Drawings

THERMOPLASTIC MOLDING COMPOSITION BASED ON AES RUBBER WITH LOW SURFACE GLOSS

FIELD OF THE INVENTION

The invention is directed to a thermoplastic composition and in particular to a molding composition containing aromatic carbonate polymer.

TECHNICAL BACKGROUND OF THE INVENTION

Thermoplastic compositions containing aromatic polycarbonate, including compositions that additionally contain an elastomeric impact modifier, are known and available commercially. Polycarbonate compositions exhibiting a low gloss are also known.

The art is noted to include U.S. Pat. No. 4,460,733 in which disclosed was a polycarbonate composition having low gloss, the composition containing silica characterized by its average particle size and specific surface area. U.S. Pat. No. 4,526,926 disclosed a low gloss polycarbonate polymer blend that contains a rubber modified copolymer such as ABS. Thermoplastic blends having a low gloss containing polycarbonate, ABS and an impact modifying graft (co)polymer were disclosed in U.S. Pat. No. 4,677,162. The polybutadiene content of the ABS is 1 to 18% and its average particle size is greater than 0.75 micron; the average particle size of the impact modifying graft is less than 0.75 micron.

Low gloss thermoplastic composition with good physical properties containing a blend of a polycarbonate with an acrylonitrile-styrene-acrylate interpolymer and a gloss-reducing amount of a glycidyl (meth)acrylate copolymer was disclosed in U.S. Pat. No. 4,885,335. U.S. Pat. No. 4,902,743 disclosed a low-gloss thermoplastic blend that contains aromatic carbonate polymer, acrylonitrile-butadiene-styrene copolymer; and a polymer of glycidyl methacrylate. Thermoplastic molding compositions having inherent matte or low gloss surface finish containing a blend of polycarbonate, an emulsion grafted ABS polymer, and a poly(epoxide) were disclosed in U.S. Pat. No. 5,026,777 and in CA2033903.

SUMMARY OF THE INVENTION

A thermoplastic composition suitable for making articles having low gloss and good impact properties is disclosed. The composition contains
(A) 20 to 94.5 percent relative to the weight of the composition (pbw) of an aromatic (co)poly(ester)carbonate,
(B) 5 to 40 pbw of a graft (co)polymer that includes an EPDM graft base and a grafted phase that is compatible with the aromatic (co)poly(ester)carbonate, and
(C) 0.5 to 20 pbw of a linear copolymer containing at least one unit derived from a glycidyl ester monomer, and
(D) 0 to 40 pbw of a vinyl copolymer. The gloss of the composition is lower than that of a corresponding composition that contains none of component (C).

DETAILED DESCRIPTION OF THE INVENTION

The inventive thermoplastic composition is suitable for preparing articles that are characterized by their low 60° gloss and good impact properties. The composition comprises
(A) 20 to 94.5, preferably 37 to 84 percent by weight relative to the weight of the composition (pbw) of an aromatic (co)poly(ester)-carbonate,
(B) 5 to 40, preferably 10 to 20 pbw of a graft (co)polymer containing EPDM graft base and a grafted phase compatible with the aromatic (co)poly(ester)carbonate, and
(C) 0.5 to 20 pbw, preferably 1 to 8 pbw of a linear copolymer containing at least one structural unit derived from a glycidyl ester monomer and
(D) 0 to 40 percent, preferably 5 to 35 percent of vinyl copolymer.

(A) Aromatic (Co)poly(ester)carbonate

The term aromatic (co)poly(ester)carbonates, refers to homopolycarbonates, copolycarbonates, including polyestercarbonates. These materials are well known and are available in commerce. (Co)poly(ester)carbonates may be prepared by known processes including melt transesterification process and interfacial polycondensation process (see for instance Schnell's "Chemistry and Physics of Polycarbonates", Interscience Publishers, 1964) and are widely available in commerce, for instance under the trademark Makrolon® from Bayer MaterialScience.

Aromatic dihydroxy compounds suitable for the preparation of aromatic (co)poly(ester)carbonates (herein referred to as polycarbonates) conform to formula (I)

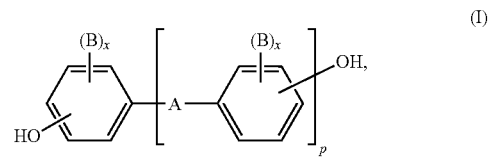

(I)

wherein
A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be condensed other aromatic rings optionally containing hetero atoms, or a radical conforming to formula (II) or (III)

(II)

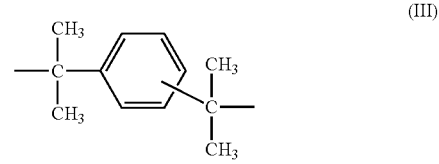

(III)

The substituents B independently one of the others denote $C_1$- to $C_{12}$-alkyl, preferably methyl, x independently one of the others denote 0, 1 or 2, p represents 1 or 0, and $R^5$ and $R^6$ are selected individually for each $X^1$ and each independently of the other denote hydrogen or $C_1$- to $C_6$-alkyl, preferably hydrogen, methyl or ethyl, $X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydrbxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl)

sulfoxides, bis-(hydroxyphenyl) ketones, bis-(hydroxyphenyl)-sulfones and α,α-bis-(hydroxyphenyl)-diisopropyl-benzenes. Particularly preferred aromatic dihydroxy compounds are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxyphenyl)-propane (bisphenol A). These compounds may be used singly or as mixtures containing two or more aromatic dihydroxy compounds.

Chain terminators suitable for the preparation of polycarbonates include phenol, p-chlorophenol, p-tert.-butylphenol, as well as long-chained alkylphenols, such as 4-(1,3-tetramethylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-.(3,5-dimethylheptyl)-phenol. The amount of chain terminators to be used is generally 0.5 to 10% based on the total molar amount of the aromatic dihydroxy compounds used. Polycarbonates may be branched in a known manner, preferably by the incorporation of 0.05 to 2.0%, based on the molar amount of the aromatic dihydroxy compounds used, of compounds having a functionality of three or more, for example compounds having three or more phenolic groups. Aromatic polyestercarbonates are known. Suitable such resins are disclosed in U.S. Pat. Nos. 4,334,053: 6,566,428 and in CA1173998, all incorporated herein by reference.

Aromatic dicarboxylic acid dihalides for the preparation of aromatic polyester carbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1. Branching agents may also be used in the preparation of suitable polyestercarbonates, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-(hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxy-triphenyl)-methyl]-benzene, in amounts of from 0.01 to 1.0 mol. %, based on diphenols used. Phenolic branching agents can be placed in the reaction vessel with the diphenols, acid chloride branching agents may be introduced together with the acid dichlorides.

The content of carbonate structural units in the thermoplastic aromatic polyester carbonates may be up to 99 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

The preferred thermoplastic aromatic polycarbonates have weight-average molecular weights (measured by gel permeation chromatography) of at least 25,000, more preferably at least 26,000. Preferably these have maximum weight-average molecular weight of 80,000, more preferably up to 70,000, particularly preferably up to 50,000 g/mol.

(B) Graft (Co)polymer

The graft (co)polymer, component (B) of the inventive composition refers to a grafted rubber wherein the rubber is a copolymer of ethylene and propylene and diene monomers (herein EPDM rubber) and a grafted rigid phase compatible with component A, (co)poly(ester) carbonate. Compatibility in the present context refers to the absence of phase separation detectable on a macro-scale.

EPDM, the grafted elastomer of the invention is well known. Relevant description of this elastomer and method for its preparation has been published in, among others U.S. Pat. Nos. 3,489,821 and 4,202,948 both incorporated herein by reference. While a variety of alpha-mono olefins may be used in preparing EPDM the preferred elastomer is a terpolymer of ethylene, propylene and ethylenically unsaturated copolymerizable non-conjugated diene monomer.

The preferred EPDM rubber has a second order transition temperature not higher than 0° C., preferably not higher than −20° C., per ASTM D-746-52T and contains one or more conjugated 1,3-dienes.

The grafted phase includes a copolymer of monovinylidene aromatic monomer and a polar comonomer. Such copolymers have been described in U.S. Pat. Nos. 3,509,237; 3,660,535; 3,243,481; 4,221,833 and 4,239,863, incorporated herein by reference. Preferably the grafted phased contains at least 49, preferably 65 to 95 weight percent monovinylidene aromatic monomer, and at least 1, preferably 5 to 35 weight percent monoethylenically unsaturated polar monomer.

For the purposes of this invention, a polar monomer is a polymerizable ethylenically unsaturated compound bearing a polar group having a group moment in the range from about 1.4 to about 4.4 Debye units and determined by Smyth, C. P., Dielectric Behavior and Structure, McGraw-Hill Book Company, Inc., New York (1955). Exemplary polar groups include —CN, —NO$_2$, —CO$_2$H, —OH, —Br, —Cl, —NH$_2$ and —OCH$_3$. Preferably, the polar monomer is an ethylenically unsaturated nitrile such as acrylonitrile and methacrylonitrile with acrylonitrile being especially preferred. Examples of such other polar monomers include α,β-ethylenically unsaturated carboxylic acids and their anhydride, and alkyl, aminoalkyl and hydroxyalkyl esters such as acrylic acid, methacrylic acid, itaconic acid, maleic anhydride, ethyl acrylate, butyl acrylate, methyl methacrylate, hydroxyethyl and hydroxypropyl acrylates, aminoethyl acrylate, and the like.

Exemplary of the monovinylidene aromatic monomers are styrene; alpha-alkyl monovinylidene monoaromatic compounds (e.g., α-methylstyrene, α-ethylstyrene, α-methylvinyltoluene, α-methyl dialkylstyrenes, etc.); ring-substituted alkyl styrenes (e.g., ortho-, meta-, and paravinyl toluene, o-ethylstyrene; p-ethylstyrene, 2,4-dimethylstyrene, p-tertiary butyl styrene, etc.); ring-substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methylstyrene, 2,6-dichloro-4-methylstyrene, etc.); vinyl naphthalene; vinyl anthracene, etc. If so desired, mixtures of such monovinylidene aromatic monomers may be employed. Particularly preferred is styrene and mixtures of styrene and alpha-methyl styrene.

The graft (co)polymer contains 10 to 80, preferably 20 to 70, percent by weight (pbw) rubber component as graft base or backbone the balance being the grafted phase The graft (co)polymer is known and available in commerce for instance from UMG ABS Ltd. as AES E700N resin.

(C) Linear Glycidyl Ester

Component (C) is a linear glycidyl ester functional polymer comprising at least one unit derived from glycidyl ester monomer(s). The glycidyl ester polymer may be a polymer, copolymer, or terpolymer. A glycidyl ester monomer means a glycidyl ester of α,β-unsaturated carboxylic acid such as, e.g., acrylic acid, methacrylic acid, itaconic acid, and includes, e.g., glycidyl acrylate, glycidyl methacrylate, glycidyl itaconate. Suitable glycidyl ester polymers useful in the present invention include the glycidyl esters (co)polymer described in U.S. Pat. No. 5,981,661, incorporated herein by reference. Preferably, the glycidyl ester polymer comprises at least one repeating unit polymerized from glycidyl ester monomer and at least one repeating unit polymerized from α-olefin monomers, e.g., ethylene, propylene, 1-butene, 1-pentene. Preferably, the glycidyl ester monomer is glycidyl acrylate or glycidyl methacrylate.

Suitable linear glycidyl ester functional polymers optionally contain a minor amount, i.e., up to about 50 wt %, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and $C_{1-20}$-alkyl (meth)acrylates such as, e.g., butyl acrylate, methyl methacrylate, cyclohexyl methacrylate. As used herein, the term $C_{1-20}$-alkyl means a straight or branched alkyl group of from 1 to 20 carbon atoms per group, such as e.g., methyl, ethyl, cyclohexyl and the term "(meth)acrylate" refers to acrylate compounds and to methacrylate compounds.

Suitable glycidyl ester copolymers may be made by conventional free radical initiated copolymerization.

More preferably, the glycidyl ester polymers useful in the present invention are selected from olefin-glycidyl (meth) acrylate polymers, olefin-vinyl acetate-glycidyl (meth)acrylate polymers and olefin-glycidyl (meth)acrylate-alkyl (meth)acrylate polymers. Most preferably, the glycidyl ester polymer is selected from random ethylene/acrylic ester/glycidyl methacrylates, copolymers or terpolymers.

In the preferred embodiment, component (C) of the inventive composition contains structural units derived from ethylene, (meth)acrylate, and glycidyl (meth)acrylate. Advantageously component C is a terpolymer selected from the group consisting of ethylene/alkylacrylate/glycidyl methacrylate; ethylene/alkyl acrylate/glycidyl acrylate; ethylene/alkyl methacrylate/glycidyl acrylate; and ethylene/alkyl methacrylate/glycidyl methacrylate. The alkyl component of the (meth)acrylate desirably contains between 1 to 10 carbon atoms. Preferably, the alkyl acrylate or methacrylate polymer of the terpolymer is a methyl acrylate or methyl methacrylate.

The relative amounts of these units are 1 to 40%, preferably 5 to 35%, more preferably 25 to 33% of (meth)acrylate, 1 to 20%, preferably 4 to 20%, more preferably 7 to 10% of glycidyl(meth)acrylate, the balance in each case, preferably 55 to 80% being units derived from ethylene.

The preferred component (C) has a melting point of about 149° F. and Vicat softening point of <100° F., measured according to ASTM D1525 under a 1 kg load. The melt index, measured at 190° C. under a 2.16 kg load using ASTM Method D1238, is 6.5 gm/10 min. Advantageously the number average molecular weight of the suitable terpolymer is 10,000 to 70,000. A terpolymer suitable as component (C) conforming to

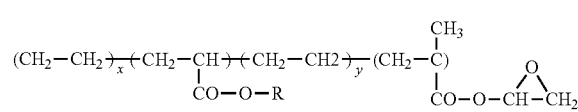

where x and y denote integers consistent with the molecular weights stated above is available commercially from Arkema as Lotader AX8900.

(D) Vinyl Copolymer

Component D of the inventive composition is a copolymer of monovinylidene aromatic monomer and a polar comonomer. Such copolymers have been described in U.S. Pat. Nos. 3,509,237; 3,660,535; 3,243,481; 4,221,833 and 4,239,863, incorporated herein by reference. The vinyl copolymer contains at least 49, preferably 65 to 95 weight percent monovinylidene aromatic monomer, and at least 1, preferably 5 to 35 weight percent monoethylenically unsaturated polar monomer.

The polar monomer has been defined above in connection with the description of component B. Preferably, the polar monomer is an ethylenically unsaturated nitrile such as acrylonitrile and methacrylonitrile with acrylonitrile being especially preferred. Suitable other polar monomers include α,β-ethylenically unsaturated carboxylic acids and their anhydride, and alkyl, aminoalkyl and hydroxyalkyl esters such as acrylic acid, methacrylic acid, itaconic acid, maleic anhydride, ethyl acrylate, butyl acrylate, methyl methacrylate, hydroxyethyl and hydroxypropyl acrylates, aminoethyl acrylate, and the like.

Suitable monovinylidene aromatic monomers are styrene; alpha-alkyl monovinylidene monoaromatic compounds (e.g., α-methylstyrene, α-ethylstyrene, α-methylvinyltoluene, α-methyl dialkylstyrenes, etc.); ring-substituted alkyl styrenes (e.g., ortho-, meta-, and paravinyl toluene, o-ethylstyrene; p-ethylstyrene, 2,4-dimethylstyrene, p-tertiary butyl styrene, etc.); ring-substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methylstyrene, 2,6-dichloro-4-methylstyrene, etc.); vinyl naphthalene; vinyl anthracene, etc. If so desired, mixtures of such monovinylidene aromatic monomers may be employed. Particularly preferred is styrene and mixtures of styrene and alpha-methyl styrene. Most suitable vinyl copolymer is styrene/acrylonitrile copolymer.

While not believed critical to the inventive composition the preferred embodiment contains a positive amount of up to 40, preferably 5 to 35 percent by weight of component (D).

The inventive composition may further include additives that are known for their function in the context of thermoplastic compositions that contain poly(ester)carbonates. These include one or more of lubricants, mold release agents, for example pentaerythritol tetrastearate, nucleating agents, antistatic agents, thermal stabilizers, light stabilizers, hydrolytic stabilizers, fillers and reinforcing agents, colorants or pigments, flame retarding agents and drip suppressants.

The inventive compositions may be prepared conventionally using conventional equipment and following conventional procedures.

The inventive composition may be used to produce moldings of any kind by thermoplastic processes such as injection molding, extrusion and blow molding methods.

The Examples which follow illustrate the invention.

EXAMPLES

In preparing the exemplified compositions that are described below the following materials were used:
Polycarbonate—a mixture containing about 85 wt. % homopolycarbonate based on bisphenol A (MFR=13 g/10 min.) and 15 wt % homopolycarbonate based on bisphenol A (MFR=38 g/10 min.) The melt flow rate (MFR) determined per ASTM D 1238 at 260° C.; 5 Kg load
Graft polymer I—AES E700N (SAN grated EPDM) having rubber content of about 60% relative to its weight, a product of UMG ABS Ltd. (Tokyo, Japan).
Linear glycidyl ester copolymer—Lotader 8900 terpolymer a product of Arkema containing about 30 percent by weight of ethyl acrylate, 62 percent by weight of ethylene, and 8 percent by weight of glycidyl methacrylate having reactive epoxy groups.
Graft polymer II—ABS prepared by mass polymerization, having particle size greater than 3 microns; Acrylonitrile content about 18%, butadiene content of 15%, and styrene content of about 63%. Graft polymer III—ABS prepared by mass polymerization, having particle size greater than 0.6 microns, acrylonitrile content about 20%, butadiene content of about 15% and styrene content of about 63% relative to its weight.

The makeup of the exemplified compositions and their properties are shown in the table below. Each of these compositions contained 0.5wt % of a conventional mold release agent and 0.2 wt % of a conventional UV stabilizer, neither of which believed to be critical to the invention.

The gloss (60° Gloss) was determined in accordance with ASTM D523 and the notched Izod impact strength (⅛") was determined at room temperature.

The preparations of the compositions and molding of test specimens were conventional.

The tables below summarize the results of these tests.

All compositions shown above exhibited ductile failure

The results demonstrate the lowered gloss of the composition attained by the inclusion of linear glycidyl ester in compositions that include the graft polymer of the invention. Compositions wherein the graft polymer is outside the scope of the invention, e.g. ABS exhibit a significant increase in gloss values.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A thermoplastic molding composition comprising:
(A) 20 to 89.5 percent by weight relative to the weight of the composition (pbw) of an aromatic (co)poly(ester)-carbonate;
(B) 5 to 40 pbw of a graft copolymer containing EPDM graft base and a grafted phase compatible with said aromatic (co)poly(ester)-carbonate, wherein the graft base is a copolymer of ethylene, propylene and ethylenically unsaturated copolymerizable non-conjugated diene monomers and wherein the grafted phase includes a copolymer of monovinylidene aromatic monomer and a polar comonomer selected from the group consisting of ethylenically unsaturated nitriles, acrylonitrile, methacrylonitrile, α,β-ethylenically unsaturated carboxylic acids and their anhydride, alkyl, aminoalkyl and hydroxyalkyl esters, acrylic acid, methacrylic acid, itaconic acid, maleic anhydride, ethyl acrylate, butyl acrylate, methyl methacrylate, hydroxyethyl and hydroxypropyl acrylates and aminoethyl acrylate, and wherein compatible means absence of phase separation detectable on a macro-scale;
(C) 0.5 to 20 pbw of a terpolymer consisting of (i) 40 to 98% by weight ethylene, (ii) 1 to 40% by weight of alkylacrylate or alkyl methacrylate, wherein the alkyl component has between 1 and 10 carbon atoms, and (iii) 1 to 20% by weight of glycidyl acrylate or glycidyl methacrylate; and

TABLE 1

| | Control 2 | Control 2 (C) | Control 3 | Control 3 (c) | Control 1 | Inventive 2 |
|---|---|---|---|---|---|---|
| Components (wt %) | | | | | | |
| Polycarbonate | 65.51 | 65.51 | 65.51 | 65.51 | 62.30 | 62.30 |
| SAN | — | — | — | — | 24.00 | 24.00 |
| Graft polymer I | — | — | — | — | 11 | 11 |
| Graft polymer II | — | — | 34.79 | 32.79 | — | — |
| Graft polymer III | 34.79 | 32.79 | — | — | — | — |
| Linear glycidyl ester | — | 2.0 | — | 2.0 | — | 2.0 |
| Properties | | | | | | |
| 60° Gloss | 60.8 | 73.0 | 39.1 | 94.8 | 53.3 | 26.3 |
| Impact @RT, ft lb/in | 13.5 | 14.8 | 11.6 | 14.3 | 12.3 | 14.2 |

(D) 5 to 35 pbw of styrene/acrylonitrile copolymer;
wherein the percents by weight total 100% and wherein the gloss is lower than that of a corresponding composition that contains none of (C).

2. The composition of claim 1, wherein the amount of aromatic (co)poly(ester)-carbonate is 37 to 84 pbw.

3. The composition of claim 1, wherein the amount of graft (co)polymer is 10 to 20 pbw.

4. The composition of claim 1, wherein the amount of terpolymer is 1 to 8 pbw.

5. The composition of claim 1, wherein the terpolymer consists of (i) 55 to 91% by weight ethylene, (ii) 5 to 35% by weight of alkylacrylate or alkyl methacrylate, wherein the alkyl component has between 1 and 10 carbon atoms, and (iii) 4 to 20% by weight of glycidyl acrylate or glycidyl methacrylate.

6. The composition of claim 5, wherein the terpolymer consists of (i) 57 to 68% by weight ethylene, (ii) 25 to 33% by weight of alkylacrylate or alkyl methacrylate, wherein the alkyl component has between 1 and 10 carbon atoms, and (iii) 7 to 10% by weight of glycidyl acrylate or glycidyl methacrylate.

7. The composition of claim 1, wherein the aromatic (co)poly(ester)-carbonate is (co)polycarbonate.

8. The composition of claim 7, wherein the (co)polycarbonate is homopolycarbonate.

9. The composition of claim 1, wherein said grafted phase includes a copolymer of at least one monovinylidene aromatic monomer and at least one a polar comonomer.

10. The composition of claim 1, wherein the terpolymer has a number average molecular weight of 10,000 to 70,000.

11. The composition of claim 1, further comprising at least one member selected from the group consisting of lubricant, mold release agents, nucleating agent, antistatic agent, thermal stabilizer, light stabilizer, hydrolytic stabilizer, filler, reinforcing agent, colorant, pigment, flame retarding agent and drip suppressant.

12. A thermoplastic molding composition comprising:
(A) 20 to 89.5 percent by weight relative to the weight of the composition (pbw) of an aromatic (co)poly(ester)-carbonate;
(B) 5 to 40 pbw of a graft copolymer containing EPDM graft base and a grafted phase compatible with said aromatic (co)poly(ester)-carbonate, wherein the graft base is a copolymer of ethylene, propylene and ethylenically unsaturated copolymerizable non-conjugated diene monomers and wherein the grafted phase includes a copolymer of monovinylidene aromatic monomer and a polar comonomer selected from the group consisting of ethylenically unsaturated nitriles, acrylonitrile, methacrylonitrile, α,β-ethylenically unsaturated carboxylic acids and their anhydride, alkyl, aminoalkyl and hydroxyalkyl esters, acrylic acid, methacrylic acid, itaconic acid, maleic anhydride, ethyl acrylate, butyl acrylate, methyl methacrylate, hydroxyethyl and hydroxypropyl acrylates and aminoethyl acrylate, and wherein compatible means absence of phase separation detectable on a macro-scale;
(C) 0.5 to 20 pbw of a linear copolymer comprising at least one structural unit derived from a glycidyl ester monomer and at least one repeating unit polymerized from an α-olefin monomer; and
(D) 5 to 35 pbw of styrene/acrylonitrile copolymer;
wherein the percents by weight total 100% and wherein the gloss is lower than that of a corresponding composition that contains none of (C).

13. The composition of claim 12, wherein the amount of aromatic (co)poly(ester)-carbonate is 37 to 84 pbw.

14. The composition of claim 12, wherein the amount of graft (co)polymer is 10 to 20 pbw.

15. The composition of claim 12, wherein the amount of linear copolymer is 1 to 8 pbw.

16. The composition of claim 12, wherein the aromatic (co)poly(ester)-carbonate is (co)polycarbonate.

17. The composition of claim 16, wherein the (co)polycarbonate is homopolycarbonate.

18. The composition of claim 12, wherein said grafted phase includes a copolymer of at least one monovinylidene aromatic monomer and at least one a polar comonomer.

19. The composition of claim 12, wherein the α-olefin monomer is a member selected from the group consisting of propylene, 1-butene and 1-pentene.

20. The composition of claim 12, further comprising at least one member selected from the group consisting of lubricant, mold release agents, nucleating agent, antistatic agent, thermal stabilizer, light stabilizer, hydrolytic stabilizer, filler, reinforcing agent, colorant, pigment, flame retarding agent and drip suppressant.

* * * * *